(12) United States Patent
Han (10) Patent No.: US 11,484,915 B2
(45) Date of Patent: Nov. 1, 2022

(54) SYSTEM, DEVICE, AND METHOD FOR ITEM SORTING AND CONVEYING

(71) Applicant: BEIJING GEEKPLUS TECHNOLOGY CO., LTD., Beijing (CN)

(72) Inventor: Hao Han, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 187 days.

(21) Appl. No.: 16/616,669

(22) PCT Filed: Dec. 12, 2017

(86) PCT No.: PCT/CN2017/115749
§ 371 (c)(1),
(2) Date: Nov. 25, 2019

(87) PCT Pub. No.: WO2019/061843
PCT Pub. Date: Apr. 4, 2019

(65) Prior Publication Data
US 2020/0147653 A1    May 14, 2020

(30) Foreign Application Priority Data

Sep. 30, 2017 (CN) .......................... 201710928843.1
Sep. 30, 2017 (CN) .......................... 201710938136.0

(51) Int. Cl.
*B07C 3/08* (2006.01)
*B07C 3/02* (2006.01)
(Continued)

(52) U.S. Cl.
CPC ................ *B07C 3/082* (2013.01); *B07C 3/02* (2013.01); *B07C 3/008* (2013.01); *B07C 3/18* (2013.01); *B65G 2201/0285* (2013.01)

(58) Field of Classification Search
CPC .. B07C 5/362; B07C 5/36; B07C 3/02; B07C 2501/0063; B07C 3/008; B07C 3/00;
(Continued)

(56) References Cited

U.S. PATENT DOCUMENTS 6,341,687 B1   1/2002  Cattaruzzi
7,197,376 B2 *  3/2007  Berdelle-Hilge ......... B07C 1/00
                                                    700/225

(Continued)

FOREIGN PATENT DOCUMENTS

CN    102300786 A   12/2011
CN    103111425 A    5/2013
(Continued)

OTHER PUBLICATIONS

International Search Report for PCT/CN2017/115749 dated Jun. 29, 2018, with English Translation.
(Continued)

*Primary Examiner* — Michael McCullough
*Assistant Examiner* — Jessica L Burkman
(74) *Attorney, Agent, or Firm* — Arentfox Schiff LLP (57) ABSTRACT

Provided is a package sorting method, a sorting area layout, a sorting system, and a path optimization method. The package sorting method includes: dividing a sorting area into at least a first logical partition close to a first item collecting area and a second logical partition close to a second item collecting area, where the first logical partition includes a first item dropping area, and the second logical partition includes a second item dropping area. By this method, a total path of package delivery is reduced.

12 Claims, 6 Drawing Sheets

(51) Int. Cl.
*B07C 3/00* (2006.01)
*B07C 3/18* (2006.01)

(58) Field of Classification Search
CPC ....... B07C 3/003; B07C 3/10; B07C 2201/00; B07C 2301/00; B65G 2201/0285
See application file for complete search history.

(56) References Cited

U.S. PATENT DOCUMENTS

| | | | |
|---|---|---|---|
| 11,001,454 B2* | 5/2021 | Becher | B65G 47/519 |
| 2004/0035762 A1 | 2/2004 | Brown | |
| 2004/0254674 A1 | 12/2004 | Nojo et al. | |
| 2013/0096713 A1 | 4/2013 | Takizawa et al. | |
| 2017/0320102 A1* | 11/2017 | McVaugh | B65G 1/0492 |

FOREIGN PATENT DOCUMENTS

| | | |
|---|---|---|
| CN | 105057219 A | 11/2015 |
| CN | 105383843 A | 3/2016 |
| CN | 105929740 A | 9/2016 |
| CN | 205740175 U | 11/2016 |
| CN | 106960301 A | 7/2017 |
| CN | 107511337 A | 12/2017 |
| CN | 107640569 A | 1/2018 |
| JP | S55156104 A | 12/1980 |
| JP | 2013129034 A | 7/2013 |
| JP | 5377961 B2 | 12/2013 |
| JP | 2016047744 A | 4/2016 |
| WO | WO-2015185628 A2 * | 12/2015 ............ B60L 58/12 |

OTHER PUBLICATIONS

Singapore Search Report and Written Opinion received for corresponding SG Application No. 11202002954W dated Nov. 16, 2020.
Australian Office Action received for corresponding AU Application No. 2017434612 dated Dec. 18, 2020.
Office Action issued for Korean Patent Application No. 10-2020-7012775, dated Oct. 15, 2021.

* cited by examiner

SYSTEM, DEVICE, AND METHOD FOR ITEM SORTING AND CONVEYING

CROSS-REFERENCE TO RELATED APPLICATIONS

This application is United States National Stage Application of co-pending International Patent Application Number PCT/CN2017/115749, filed on Dec. 12, 2017, which claims the priority of Chinese patent application No. 201710938136.0, filed on Sep. 30, 2017, and Chinese patent application No. 201710928843.1, the contents of which are hereby incorporated herein by reference in their entireties.

TECHNICAL FIELD

The present application relates to the technical field of item sorting, and more particularly relates to an item sorting method, a sorting area layout, a sorting system, and a path optimization method.

BACKGROUND

A package sorting robot system is a logistics sorting system that emerges thanks to China's national conditions and geographical factors as well as a consideration of the balance between labor costs of China's labor-intensive industries and costs of sophisticated complex automation equipment. By virtue of the instant response of robots and the flexibility of distributed systems, the package sorting robot system can significantly reduce the overall cost of package sorting.

SUMMARY

In view of the above, the present application provides an item sorting method, a sorting area layout, a sorting system, and a path optimization method, where item sorting method may shorten the path of movement of a mobile transporting device thereby reducing energy consumption.

An aspect of the present application provides an item sorting method. The item sorting method includes: dividing a sorting area into at least a first logical partition close to a first item collecting area and a second logical partition close to a second item collecting area, where the first logical partition includes a first item dropping area, and the second logical partition includes a second item dropping area; obtaining, by a transporting device located in the first logical partition, an item from the first item collecting area, and moving to the first item dropping area within the first logical partition to deliver the item to the first item dropping area; and obtaining, by a transporting device located in the second logical partition, an item from the second item collecting area, and moving to the second item dropping area within the second logical partition to deliver the item to the second item dropping area.

In an embodiment, the first item dropping area includes multiple temporary item storage containers intended for all road direction and/or the second item dropping area includes multiple temporary item storage containers intended for all road directions.

In an embodiment, the method further includes: setting the first item collecting area and the second item collecting area in the center of the sorting area, and setting the first item dropping area and the second item dropping area in the periphery of the sorting area, where the first item collecting area and the second item collecting area are an annular conveyor belt.

In an embodiment, the first logical partition is an area on the same side as the first item collecting area, and the second logical partition is an area on the same side as the second item collecting area.

In an embodiment, the first item dropping area includes multiple temporary item storage containers intended for only a part of all road directions, and/or the second item dropping area includes multiple temporary item storage containers intended for only a part of all road directions.

In an embodiment, the "dividing a sorting area into at least a first logical partition close to a first item collecting area and a second logical partition close to a second item collecting area" further includes: setting a common area outside the first logical partition and the second logical partition, and setting multiple temporary item storage containers for the remaining road directions in the common area.

Another aspect of the present application provides a sorting area layout. The sorting area layout includes an item collecting area located in a center of the sorting area and an item dropping area located in a periphery of the sorting area. The item collecting area includes a first item collecting area and a second item collecting area, and the sorting area includes a first logical partition close to the first item collecting area and a second logical partition close to the second item collecting area. The item dropping area includes a first item dropping area and a second item dropping area, where the first item dropping area is located within the first logical partition and is configured for receiving items intended for multiple road directions, and the second item dropping area is located within the second logical partition and is configured for receiving items intended for multiple road directions.

In an embodiment, the first item dropping area and the second item dropping area are each configured for receiving items intended for all road directions.

In an embodiment, the sorting area further includes a common area located outside the first logical partition and the second logical partition, and the common area includes a third item dropping area, where the first item dropping area and the second item dropping area are configured for receiving items intended for only a part of all road directions, and the third item dropping area is configured for receiving items intended for remaining road directions.

In an embodiment, an edge of the item dropping area includes a structure recessed toward the center of the sorting area.

In an embodiment, the edge of the item dropping area is a sawtooth structure.

Another aspect of the present application provides an item sorting system configured for sorting items in a sorting area. The item sorting system includes multiple transporting devices. The sorting area includes an item collecting area and an item dropping area, where the item collecting area includes at least a first item collecting area and a second item collecting area, and the sorting area includes a first logical partition close to the first item collecting area and a second logical partition close to the second item collecting area. The item dropping area includes a first item collecting area and a second item collecting area, the first item collecting area is located in the first logical partition, and the second item collecting area is located in the second logical partition. A transporting device located in the first logical partition is configured to obtain an item from the first item collecting area and move to the first item dropping area along the first logical partition to deliver the item to the first item dropping area. A transporting device located in the second logical partition is configured to obtain an item from the second item collecting area and move to the second item dropping area along the second logical partition to deliver the item to the second item dropping area.

In an embodiment, the first item dropping area and/or the second item dropping area each include multiple temporary item storage containers intended for all road directions.

In an embodiment, the first item dropping area and/or the second item dropping area respectively include multiple temporary item storage containers for a part of all road directions.

In an embodiment, the sorting area further includes a common area located outside the first logical partition and the second logical partition, where the common area includes multiple temporary item storage containers intended for the remaining road directions.

In an embodiment, the item collecting area is an annular conveyor belt disposed in the sorting area, and the item dropping area is located in the periphery of the sorting area.

In an embodiment, the first logical partition is located on the same side as the first item collecting area, and the second logical partition is located on the same side as the second item collecting area.

In an embodiment, an edge of the item dropping area includes a structure recessed toward the center of the sorting area.

In an embodiment, the edge of the item dropping area is a sawtooth structure.

Another aspect of the present application provides a path optimization method for an item sorting system. The method includes: mapping a container with a short delivery distance to a road direction with a high delivery probability, so as to minimize a total delivery distance of a transporting device.

In an embodiment, the "mapping a container with a short delivery distance to a road direction with a high delivery probability, so as to minimize a total delivery distance of a transporting device" comprises the following solution:

assuming there are N road directions and N temporary item storage containers in the sorting area, a path distance of one round-trip delivery corresponding to an ith temporary item storage container is $S_i$, a probability of a jth road direction being selected in each delivery is $P_j$, and $i, j \in \{1, 2, \ldots, N\}$, so that each probability meets the following relationship:

$$\sum_{j=1}^{N} P_j = 1$$

s then a mapping of the container i to the direction j, $f:i \rightarrow j$, is optimized by the following formula:

$$f_{opt}: i \rightarrow j = \underset{f:i \rightarrow j}{\operatorname{argmin}} \sum_{i=1}^{N} E(S_i P_i)$$

In yet another aspect, the present application provides an item delivery system, including:

a mobile transporting device, provided with a bearing device configured to carry one or more to-be-delivered items; and a transferring device, which is in a communication connect with the mobile transporting device and includes a receiving end configured for receiving the one or more to-be-delivered items, where the transferring device is configured to automatically receive by the receiving end the one or more to-be-delivered items delivered by the mobile transporting device matching a current task and transfer the received one or more to-be-delivered items to a destination.

According to an implementation, the one or more to-be-delivered items include road direction information, and the mobile transporting device is operative to obtain the road direction information of the one or more to-be-delivered item.

According to an implementation, the transferring device includes an identifier (ID), which matches the road direction information of the one or more to-be-delivered items.

According to an implementation, the mobile transporting device is configured to obtain the road direction information of the one or more to-be-delivered items delivered in the current task and determine a transferring device matching the current task based on the road direction information of the one or more to-be-delivered items delivered in the current task.

According to an implementation, the mobile transporting device has a first height adjustment device operative to adjust a height of the bearing device.

According to an implementation, the mobile transporting device is configured to obtain a height of a receiving end of the transferring device matching the current task and control the first height adjustment device to lift the bearing device to a first preset height, the first preset height matching the height of the receiving end of the transferring device matching the current task.

According to an implementation, the transferring device has a second height adjustment device operative to adjust the height of the receiving end.

According to an implementation, the transferring device is configured to obtain a height of a bearing device of the mobile transporting device matching the current task and control the second height adjustment device to adjust the receiving end to a second preset height, the second preset height matching the height of the bearing device of the mobile transporting device matching the current task.

According to an implementation, the system further includes:

a scheduling server, connected to at least one selected from the group consisting of the mobile transporting device and the transferring device.

According to an implementation, the scheduling server is configured to obtain state of charge information of the mobile transporting device.

In response to determining that the remaining state of charge of the mobile transporting device meets a preset condition, the scheduling server is configured to control the mobile transporting device to move to a preset area to get charged.

According to an implementation, the mobile transporting device is configured to be navigated by identifying a graphic combination.

In yet another aspect, the present application provides an item delivery method. The method includes:

using a bearing device on a mobile transporting device to carry one or more to-be-delivered items; and using a receiving end of a transferring device in a communication connection with the mobile transporting device to automatically receive the one or more to-be-delivered item delivered by the mobile transporting device matching a current task and deliver the received one or more to-be-delivered item to a destination.

According to an implementation, the one or more to-be-delivered items include road direction information, and the mobile transporting device is operative to obtain the road direction information of the one or more to-be-delivered items.

According to an implementation, the transferring device includes an ID, which matches the road direction information of the one or more to-be-delivered items.

According to an implementation, the mobile transporting device is configured to obtain the road direction information of the one or more to-be-delivered items delivered in the current task and determine a transferring device matching the current task based on the road direction information of the one or more to-be-delivered items delivered in the current task.

According to an implementation, the mobile transporting device is provided with a first height adjustment device operative to adjust a height of the bearing device.

According to an implementation, a height of the receiving end of the transporting device matching the current task is obtained and the first height adjustment device is controlled to lift the bearing device to a first preset height, where the second preset height matches the height of the receiving end of the transporting device matching the current task.

According to an implementation, the transferring device is provided with a second height adjustment device operative to adjust the height of the receiving end.

According to an implementation, a height of the bearing device of the mobile transporting device matching the current task is obtained and the second height adjustment device is controlled to adjust the receiving end to a second preset height that matches the height of the bearing device of the mobile transporting device matching the current task.

According to an implementation, the item delivery method further includes:

configuring a scheduling server to connect to at least one selected from the group consisting of the mobile transporting device and the transferring device.

According to an implementation, the scheduling server is operative to obtain state of charge information of the mobile transporting device.

In response to determining that the remaining state of charge of the mobile transporting device meets a preset condition, the scheduling server is configured to control the mobile transporting device to move to a preset area to get charged.

According to an implementation, the mobile transporting device is configured to be navigated by identifying a graphic combination.

By the item sorting method according to the present application, the sorting area is divided into logical partitions thereby reducing the distance of movement of the mobile transporting device and reducing the energy consumption. The mobile transporting device and the transferring device are configured to be in a communication connection, so that the transferring device is able to automatically receive by the receiving end the to-be-delivered items delivered by the mobile transporting device matching the current task. Furthermore, when the items are delivered to the receiving end, the transferring device may automatically adjust its height, so that the automation of the item delivery is guaranteed thus improving the item delivery efficiency.

DETAILED DESCRIPTION

For a better understanding of the present application by those skilled in the art, the present application will be described in detail in connection with the drawings and specific embodiments.

As used herein, terms "transporting device" and "mobile transporting device" are used interchangeably; that is, both have the same meaning that refers to a mobile transporting vehicle configured to transport an item to be delivered. Similarly, terms "to-be-delivered item" and "to-be-sorted item" are used interchangeably, and terms "delivery information" and "road direction information" are used interchangeably.

A floor-standing (a non-steel platform structure) package sorting robot system is a special form of a package sorting robot system. It features that the item piling area is located in the center of a rectangular site, a package transport line continuously transports the package to a loop around the item piling area, and package temporary containers mapped to various road directions are arranged around the rectangular site one after another. A robot obtains the package from the loop transport line in a manual way in the central item piling area, and then delivers the package to the temporary package storage containers at the edge of the site.

For sake of clarity, the following description uses the term "parcel" rather than "item", but it is to be understood that the present application may be used for sorting various items, and is not limited to sorting packages. Similarly, the item dropping area is illustrated by example of the temporary package storage container, but for a steel platform having a partitioned structure, the item dropping area may also be set as a partition, or the item dropping area may also be only a marked location drawn on the sorting site. Furthermore, the present application may also be applied to a steel platform structure.

By arranging the site of the floor-standing package sorting robot system, the distance of movement of the transporting device may be reduced and the system efficiency may be optimized.

Figure 1A:
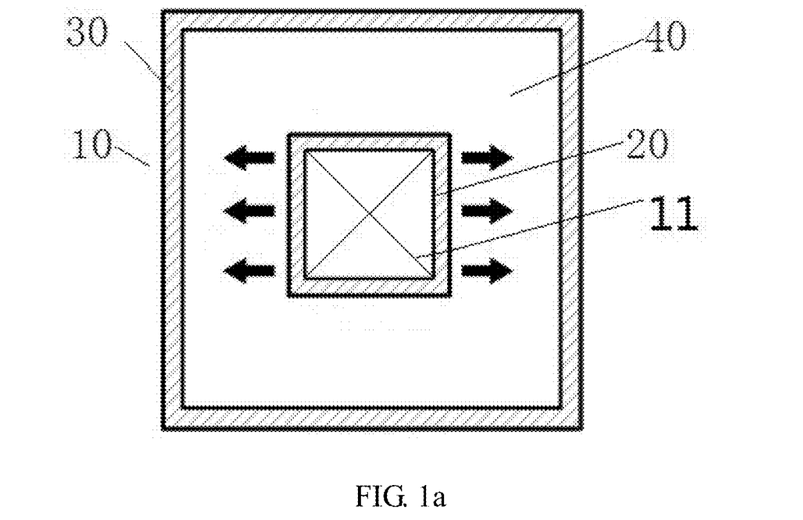
FIGS. 1a and 1b are schematic diagrams of a sorting area.
Figure 1B:
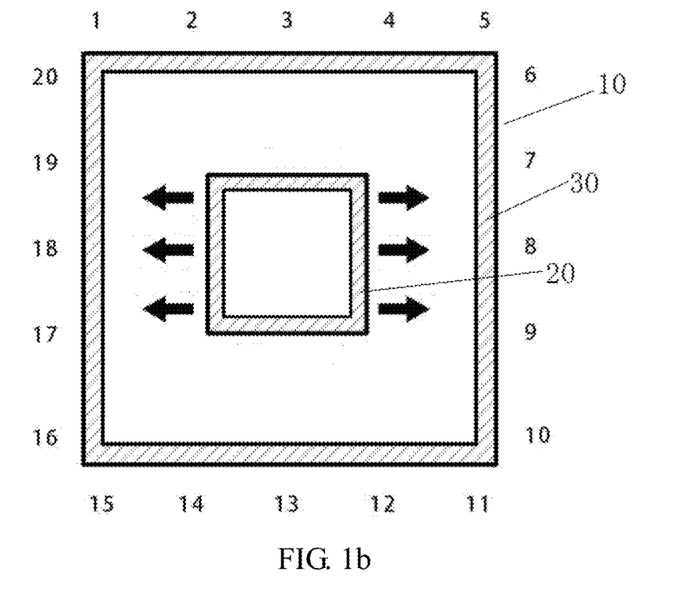

FIGS. 1a and 1b show schematic diagrams of a sorting site. Referring to FIGS. 1a and 1b, an item collecting area 20 is set in the center of the sorting area 10. The item collecting area 20 includes a loop transport line. The package is placed on the loop transport line and moves on a conveyor belt, which is convenient for an operator to remove the package from the transport line to place the package on the transporting device (not shown in FIG. 1a or 1b) for transportation. The temporary package storage container is placed on a position such as an item dropping area 30 around the site, and the transporting device moves within the area 40 shown in FIG. 1a. It can be seen that the distance of moving from each item supplying end to each temporary package storage container is different. For example, the path of a sorting robot moving from the item supplying end to the temporary package storage container may be defined as a delivery path. For example, when the sorting robot receives the package at the item supplying end on the left side of the schematic diagram and needs to deliver the package to the temporary package storage container on the left side of the schematic diagram, the delivery distance is the shortest. On the contrary, when the sorting robot receives the package at the item supplying end on the left side of the schematic diagram but needs to deliver the package to the temporary package storage container on the right side of the schematic diagram, the sorting robot have to cross a half of the site to deliver the package, in which case the delivery distance is the longest.

Figure 2:
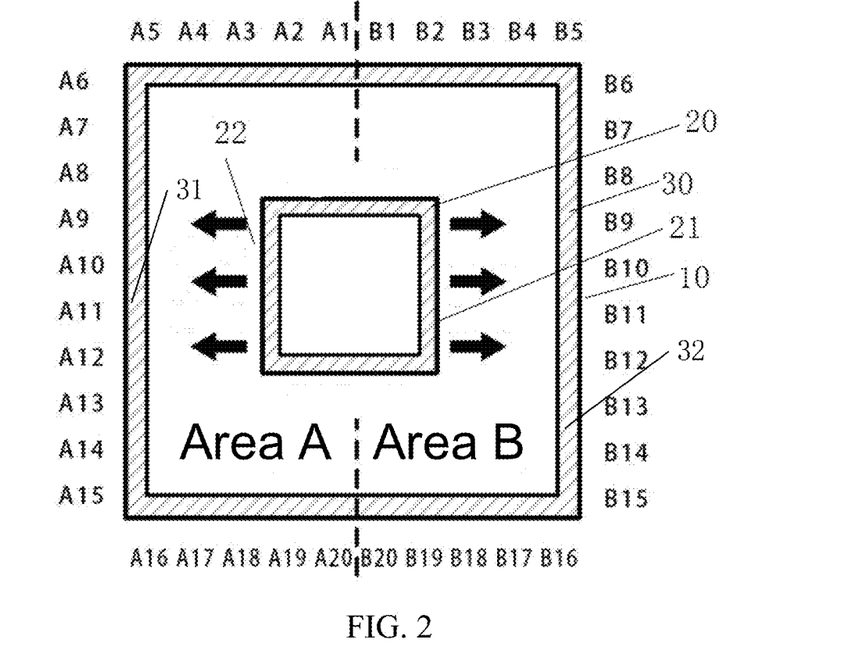
FIGS. 2 and 3 are schematic diagrams of a sorting area according to embodiments of the present application.

One aspect of the present application provides an item sorting method. Referring to FIG. 2, the method includes: dividing a sorting area 10 into at least a first logical partition A close to a first item collecting area 22 and a second logical partition B close to a second item collecting area 21. The first logical partition A includes a first item dropping area 31, and the second logical partition B includes a second item dropping area 32. A transporting device located in the first logical partition A may obtain a package from the first item collecting area 22, and then move to the first item dropping area 31 within the first logical partition A (along the direction of a black arrow on the left side of FIG. 2) to deliver the package to the first item dropping area 31. A transporting device located in the second logical partition B may obtain a package from the second item collecting area 21 and then move to the second item dropping area 32 within the second logical partition B (along the direction of a black arrow on the right side of FIG. 2) to deliver the package to the second item dropping area. By the method of the present application, the package located in the item collecting area may be delivered to a closer item dropping area, thereby reducing the distance of movement of the transporting device and improving the sorting efficiency.

It should be noted that the sorting area may be divided into a number of the logical partitions as needed, and may be two or more. For example, the logical partitions may also partially overlap. Typically, no logical partition overlaps with another logical partition. Each logical partition described above may correspond to a specific item collecting area. For example, a temporary package storage container of a certain logical partition may only accept packages of a specific number of item supplying ends. For example, one item supplying end may correspond to multiple logical partitions. By confining the movement path of the transporting device within a logical partition, the transporting device may avoid moving across multiple logical partitions.

In addition, when the sorting site is divided into multiple logical partitions, each logical partition has corresponding temporary package storage containers. For example, as illustrated in FIG. 2, the sorting area is divided into two logical partitions A and B. The partition A includes temporary package storage containers numbered from A1 to A20, and the partition B includes temporary package storage containers numbered from B1 to B20. The paths corresponding to the containers are arranged in a mirror-image manner and reused among multiple logical partitions, that is, each logical partition includes all road directions. That is, containers A1-A20 and B1-B20 all collect packages intended for all road directions. When each logical partition is provided with temporary package storage containers having all road directions, the delivery of all paths may be fulfilled in any logical partition. In actual operation, since each logical partition includes the temporary package storage containers intended for all road directions, the operator may randomly pick up a package on the conveyor belt and place the package on the sorting robot for a specific road direction when, for example, the package conveyor belt is rotating carrying the package. Therefore, when picking up a specific package, the operator does not need to leave his position and move to other positions, which facilitates the operation of the operator.

Specifically, in an embodiment, the method further include: setting the item collecting area 20 in the center of the sorting area 10, and setting the item dropping area 30 in the periphery of the sorting area 10, where the item collecting area 20 is an annular conveyor belt.

In an embodiment, the first logical partition A is an area on the same side as the first item collecting area 22, and the second logical partition B is an area on the same side as the second item collecting area 21. By setting a logical partition on the same side of a certain item collecting area (for example, the first logical partition is located on the left side of the conveyor belt), the path of movement of the transporting device may be minimized, thereby improving the sorting efficiency.

When the logical partition reuses the road directions, the number of containers which needs to be set will multiply. Therefore, when the perimeter of the sorting site is not large enough to accommodate all of the reused containers, the logical partition may be reduced without having to accommodate all road directions, referring to FIG. 3. Specifically, in an embodiment, the first item dropping area includes multiple temporary package storage containers intended for only a part of all road directions (A1-A12) and/or the second item dropping area includes multiple temporary package storage containers intended for only a part of all road directions (B1-B12). A common area C is also included outside the logical partitions. The temporary package storage containers intended for the remaining road directions may be set in the common area C. Therefore, when the sorting site is insufficient, the sorting site is divided into the logical partitions and the common area, so that the path of transport of the transporting device is reduced, thereby improving the sorting efficiency.

Figure 3:
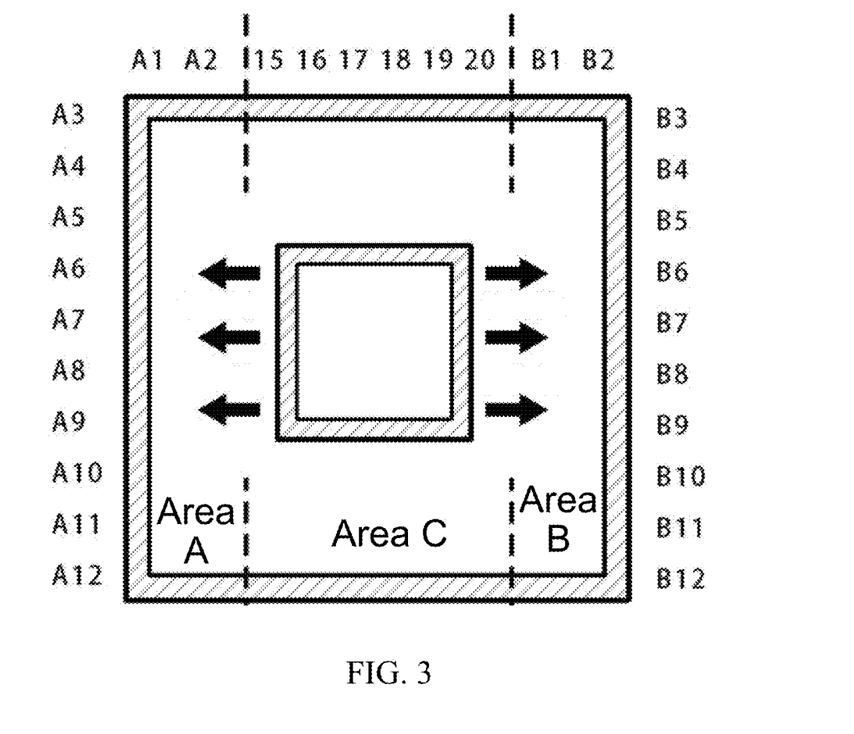

Specifically, the step of dividing a sorting area 10 into at least a first logical partition A close to a first item collecting area 22 and a second logical partition B close to a second item collecting area 21 may further include: setting a common area outside the first logical partition A and the second logical partition B, and setting multiple temporary package storage containers intended for the remaining road directions in the common area C. As mentioned above, when the sorting site is insufficient, the method reduces the path of transport of the transporting device by dividing the sorting site into the logical partitions and the common area, thereby improving the sorting efficiency.

Figure 4:
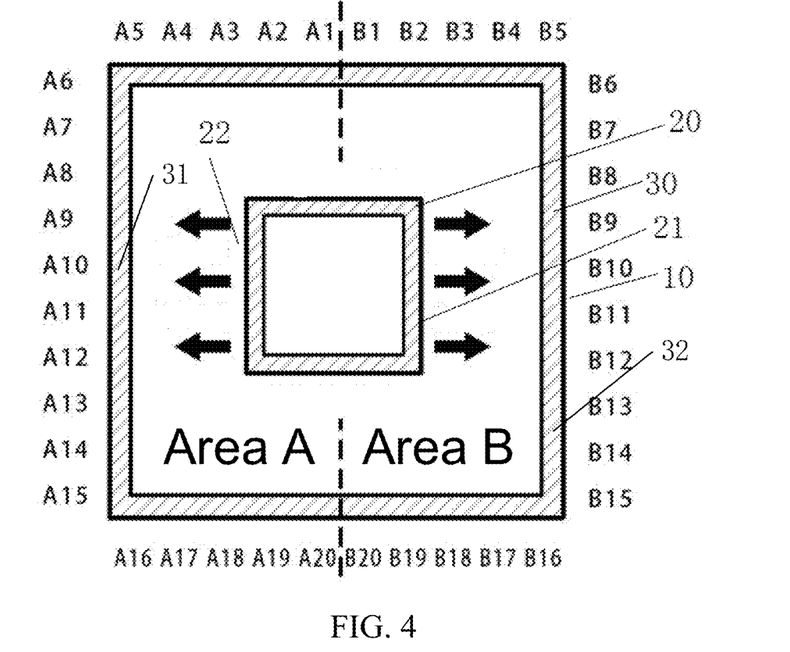
FIG. 4 is a schematic diagram of a sorting area layout according to an embodiment of the present application.

Another aspect of the present application provides a sorting area layout. Referring to FIG. 4, the layout of the sorting area 10 includes: an item collecting area 20 located in the center of the sorting area and an item dropping area 30 located in the periphery of the sorting area. The item collecting area 20 includes a first item collecting area 22 and a second item collecting area 21. The sorting area 10 includes a first logical partition A close to the first item collecting area 22 and a second logical partition B close to the second item collecting area 21. The item dropping area 30 includes a first item dropping area 31 and a second item dropping area 32. The first item dropping area 31 is located within the first logical partition A and is configured for receiving packages intended for multiple road directions, and the second item dropping area 32 is located within the second logical partition B and is configured for receiving packages intended for multiple road directions. The layout of the sorting area in the present application divides the sorting area into at least two logical partitions, so that after receiving the package from the item collecting area, the sorting robot only moves within the logical partition of the corresponding item collecting area, and delivers the package to the item dropping area in the logical partition, thereby reducing the package transport path and improving the sorting efficiency.

In an embodiment, the first item dropping area and the second item dropping area are each configured for receiving packages intended for all road directions (that is, A1-A20 and B1-B20 are for packages intended for all road directions). That is, each logical partition may receive all packages from the item collecting area, and the transporting device may deliver the package to the temporary package storage container for a corresponding road direction after receiving the package. For example, in the case where the item collecting area is located in the center of the sorting area and is a rotating conveyor belt, the operator in the item collecting area may place all packages on the transporting device without moving to other locations.

As mentioned above, in an embodiment, the sorting area further includes a common area C located outside the first logical partition A and the second logical partition B. The common area C includes a third item dropping area. The first item dropping area and the second item dropping area are configured for receiving packages intended for only a part of all road directions, and the third item dropping area is configured for receiving packages intended for the remaining road directions. In the case of a large number of package road directions, if temporary package storage containers for all road directions are placed in each logical partition, the demand for temporary package storage containers will be greatly increased, and these temporary package storage containers may not be accommodated in the limit sorting area. In this case, temporary package storage containers intended for several road directions may be set in the logical partitions, and temporary package storage containers intended for the remaining road directions outside the logical partitions are placed in the common area, so that the operator may place packages for road directions outside logical partitions into temporary package storage containers set in the common area.

In this embodiment, the road directions with a large number of packages may be set in the logical partitions, so that the transporting device may complete the package delivery in the logical partitions. Therefore, the temporary package storage containers may not excessively occupy too much space in the sorting area, thereby significantly reducing the total path travelled by the transporting device when transporting the same number of packages.

Figure 5:
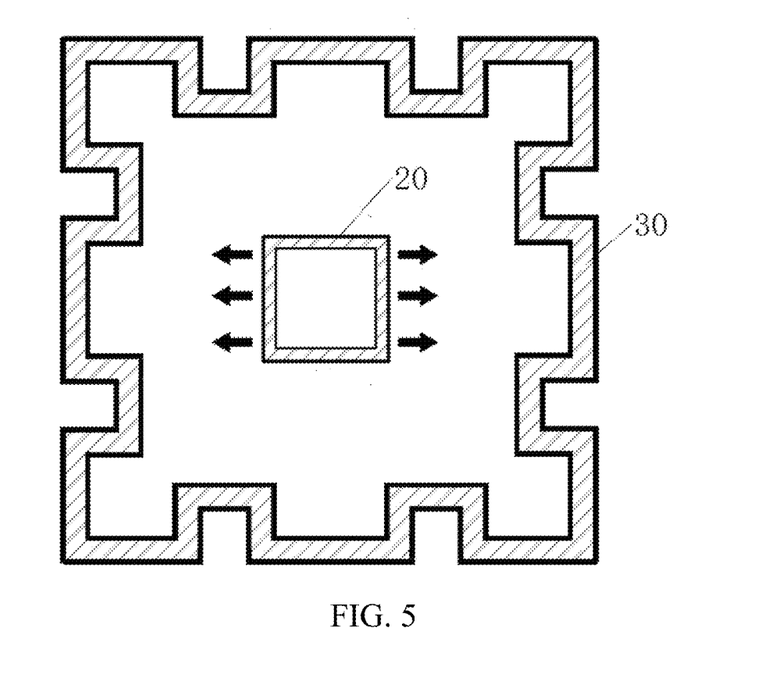
FIG. 5 is a schematic diagram illustrating a layout of a sorting area with an edge of a sawtooth structure according to an embodiment of the present application.

Referring to FIG. 5, in an embodiment, an edge of the item dropping area 30 includes a structure recessed toward the center of the sorting area 10. For example, when the area of the sorting area 10 is limited, the number of temporary package storage containers may be increased by arranging the edge of the item dropping area 30 in a concave shape. For example, specifically, the edge of the item dropping area may be a sawtooth structure as illustrated in FIG. 5. That is, temporary package storage containers may be arranged, for example, in the concave sawtooth shape.

Figure 6:
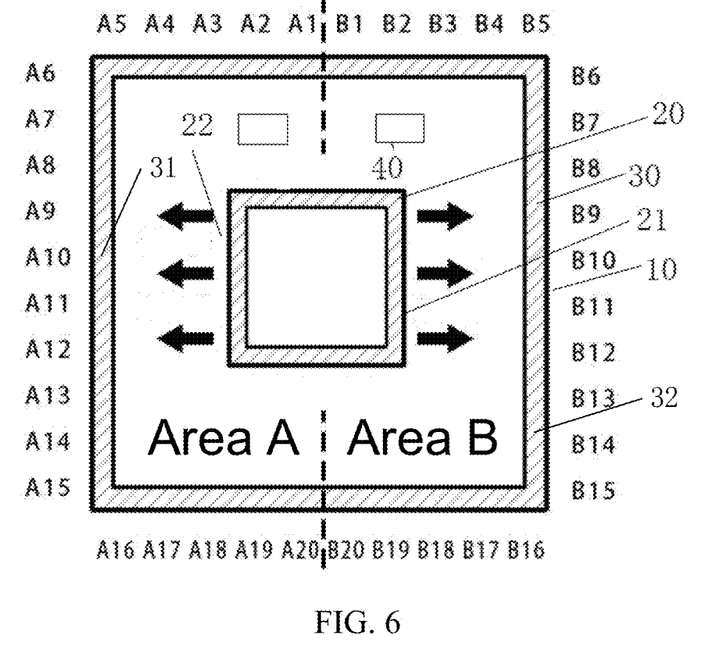
FIG. 6 is a schematic diagram of an item sorting system according to an embodiment of the present application.

Another aspect of the present application provides a package sorting system. Referring to FIG. 6, the system is configured for sorting packages in the sorting area. The system includes multiple transporting devices 40. The sorting area 10 includes an item collecting area 20 and an item dropping area 30, where the item collecting area 20 at least includes a first item collecting area 22 and a second item collecting area 21, and the sorting area 10 includes a first logical partition A close to the first item collecting area 22 and a second logical partition B close to the second item collecting area 21. The item dropping area 30 includes a first item collecting area 31 and a second item collecting area 32, where the first item collecting area 31 is located in the first logical partition A, and the second item collecting area 32 is located in the second logical partition B. A transporting device 40 located in the first logical partition A may obtain a package from the first item collecting area 22 and then move to the first item dropping area 31 along the first logical partition A to deliver the package to the first item dropping area 31. A transporting device 40 located in the second logical partition B may obtain a package from the second item collecting area 21 and then move to the second item dropping area 32 along the second logical partition B to deliver the package to the second item dropping area 32. In the package sorting system according the present application, the transporting device 40 may obtain the package from the item collecting area and then deliver the package to the logical partition near the item collecting area, thereby preventing the transporting device from delivering the package to the corresponding temporary package storage container outside the logical partition. Therefore, the path of transport of the transporting device is decreased thereby reducing the energy consumption of the transporting device.

In an embodiment, the first item dropping area and/or the second item dropping area each include multiple temporary package storage containers intended for all road directions. Since temporary package storage containers intended for all road directions are set in each item dropping area, the transporting device 40 in a certain logical partition may accomplish package delivery to all road directions only in the logical partition after obtaining the package in the item collecting area, thereby effectively reducing the delivery path.

If the capacity of the sorting area is limited and there are a large number of package road directions, and if the temporary package storage containers intended for all road directions are set in each logical partition, the total number of packages in the sorting site will be greatly increased. In this case, only temporary package storage containers intended for several road directions may be set within each logical partition. For example, the sorting area may further include a common area outside the logical partitions. The common area may include multiple temporary package storage containers intended for the remaining road directions. Furthermore, road directions within the logical partition may be road direction with a large number of packages, so that the transporting device may accomplish the delivery of these packages only within the logical partition, thereby reducing the total path of package delivery.

As mentioned above, in an embodiment, the item collecting area 20 is an annular conveyor belt located in the sorting area, and the item dropping area 30 is located in the periphery of the sorting area 10. For example, the first logical partition A is located on the same side as the first item collecting area 22, and the second logical partition B is located on the same side as the second item collecting area 21.

As mentioned above, in order to increase the number of packages arranged in the sorting site, in an embodiment, the edge of the item dropping area 30 is a structure recessed toward the center of the sorting area 10. For example, temporary package storage containers are set on the edge of the item dropping area 30, and the temporary package storage containers are arranged to be recessed toward the center of the sorting site. Furthermore, the temporary package storage containers may be set in a sawtooth layout.

Another aspect of the present application provides a path optimization method for a package sorting system. The method includes: mapping a container with a short delivery path to a road direction with a high delivery probability, so as to minimize the total delivery path loss of a transporting device. That is, the transporting device selects the short delivery path as much as it can to deliver the package, thereby reducing the total path of package delivery.

In an embodiment, mapping a container with a short delivery distance to a road direction with a high delivery probability so as to minimize a total delivery path of a transporting device is calculated in the following manner:

assuming there are N road directions and N temporary package storage containers in the sorting area, a path distance of one round-trip delivery corresponding to an ith temporary package storage container is Si, a probability of selecting a jth road direction in each delivery is Pj, and i, j $\in\{1, 2, \ldots, N\}$, so that each probability meets a following relationship:

$$\sum_{j=1}^{N} P_j = 1$$

then a mapping of the container i to the road direction j, $f:i \rightarrow j$, is optimized by the following formula:

$$f_{opt}: i \rightarrow j = \operatorname*{argmin}_{f:i \rightarrow j} \sum_{i=1}^{N} E(S_i P_i)$$

That is, the optimal mapping between the road direction and the container may satisfy the condition that the expected sum of delivery probabilities of all road direction times delivery distances of corresponding containers is the smallest. That is, the container with a shorter delivery distance should be mapped to the road direction with a larger delivery probability.

Mapping the container and the road direction in this way may greatly reduce the distance traveled by the robot when delivering the same number of packages, thereby improving the sorting efficiency of the entire system.

The embodiments of the present application are based on the floor-standing package sorting robot system. The constructive optimization of both the layout of temporary package storage containers in the system and the mapping relationship between the containers and delivery road directions may improve the sorting efficiency of the package sorting robot system and reduce the system cost at the same efficiency requirements.

Figure 7:
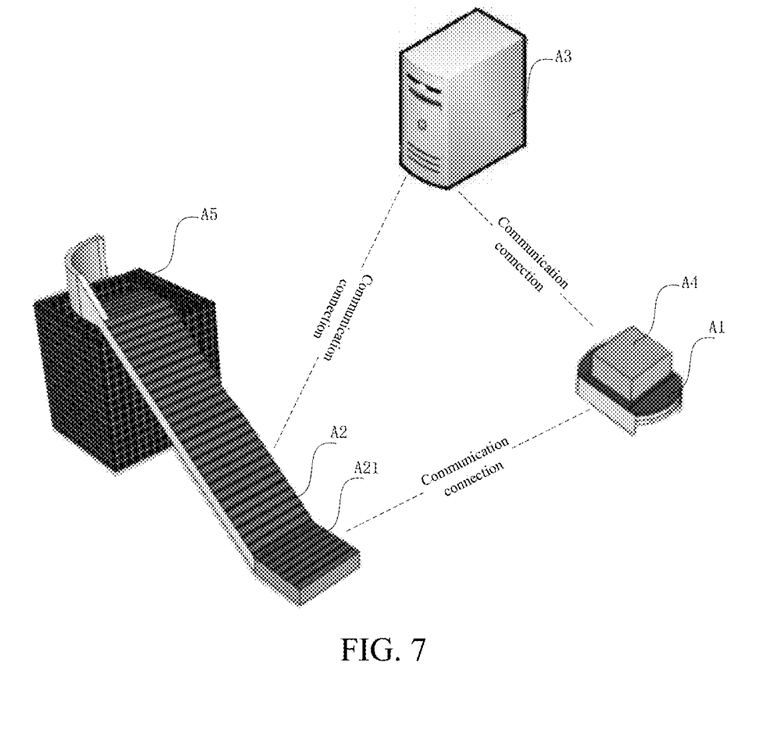
FIG. 7 is a schematic diagram of an item delivery system according to an embodiment of the present application.

FIG. 7 is a schematic diagram of an item delivery system according to an embodiment of the present application. The item delivery device includes a mobile transporting device A1 and a transferring device A2.

The mobile transporting device A1 is provided with a bearing device. The bearing device is configured to carry one or more to-be-delivered items.

The bearing device is operative to carry one or more to-be-delivered items. The to-be-delivered item may be a package, or may be other to-be-transported items. The bearing device is a device having an accommodation structure. After a delivery device arrives at an item sending end (e.g., an item supplying end for sending items), the item may be placed manually on the bearing device, or the to-be-sorted item may be automatically placed through an automatic loading device (e.g., a robot arm) of the item supplying end.

According to delivery tasks, the bearing device may receive one or more to-be-delivered items. The destinations of the one or more to-be-delivered items may be the same, or may be different. When the delivery destinations are the same, the bearing device may transport the items to the item receiving end (e.g., an item conveyor belt or a cage trolley) at one time or in multiple times. When the delivery destinations are different, the bearing device may release corresponding items at item receiving ends representing different destinations. In this way, the space of the bearing device may be fully used, and the efficiency of the mobile transporting device A1 may be improved. Specifically, the mobile transporting device A1 with an adaptive height may be a package delivery robot, or may be other devices that perform the same or similar functions.

Optionally, once the bearing device receives the item, the mobile transporting device A1 may obtain item information of the one or more to-be-delivered items. The item information includes a delivery destination of the to-be-delivered item (e.g., Haidian District, Beijing) and a type of the to-be-delivered item (e.g., books or fragile items). After obtaining the item information, the mobile transporting device A1 may obtain information of a transferring device (e.g., a conveyor belt, a conveyor elevator, or a cage trolley) corresponding to the delivered item by checking a server. The height of a receiving end A21 of the transferring device matching the mobile transporting device A1 is naturally queried by querying the information of the transferring device. On the one hand, the height of the receiving end A21 of the transferring device matching the mobile transporting device A1 may be issued through the server. On the other hand, there may be a height database inside the mobile transporting device A1, and the mobile transporting device A1 may obtain the height information by querying the height database.

When the mobile transporting device A1 approaches the transferring device, a height adjustment device on the mobile transporting device A1 adjusts a height of the bearing device to a height matching the receiving end A21. The height adjustment device may be a common hydraulic lifting device, a common stud lifting device, or other common lifting devices, where the structure of the height adjustment device will not be limited herein. The transferring device A2 is in a communication connection with the mobile transporting device A1. The transferring device A2 and the mobile transporting device A1 may be directly connected in a wired or wireless (WIFI, Bluetooth, infrared, radio frequency, etc.) manner, or may be in an indirect communication connection by connecting to a server A3 illustrated in FIG. 7.

The transferring device A2 has the receiving end A21. The receiving end A21 may receive the item A4 delivered by the mobile transporting device A1. The item A4 is delivered to a corresponding receiving container A5 (e.g., a cage trolley, a package bag, etc.) through a delivery device (e.g., a conveyor belt) on the transferring device. The transferring device A2 has the receiving end A21 for receiving the one or more to-be-delivered items. The transferring device A2 automatically receives to-be-delivered items delivered by the mobile transporting device A1 matching a current task through the receiving end A21 and transfers the received to-be-delivered items to the destination.

In order to determine a specific transport destination of the to-be-delivered item, the to-be-delivered item is provided with a transport tag for storing delivery information. The transport tag may be a two-dimensional (2D) barcode, an RFID tag, etc. The delivery information of the to-be-delivered item at least includes transport destination information of the item (e.g., Guangzhou, Shanghai, Shenyang, etc.), and may also include other information. According to a specific implementation, the to-be-delivered item includes road direction information, and the mobile transporting device A1 is capable of obtaining the road direction information of the to-be-delivered item.

In order to rapidly identify the delivery information of the to-be-sorted goods, specifically, the item supplying end may include deliver information obtaining device for identifying the transport tag on the to-be-sorted item. The delivery information obtaining device may be a camera for obtaining tag information such as the 2D barcode on the to-be-sorted goods, so as to obtain the delivery information of the to-be-sorted item. In addition, the delivery information obtaining device may further be an RFID reader for obtaining RFID tag information on the to-be-sorted goods, so as to obtain the delivery information of the to-be-sorted item. The mobile transporting device A1 may obtain road direction information of the to-be-delivered item obtained by the delivery information obtaining device by querying the server, or may also integrate the delivery information obtaining device into the mobile transporting device A1 to obtain related information.

Figure 8:
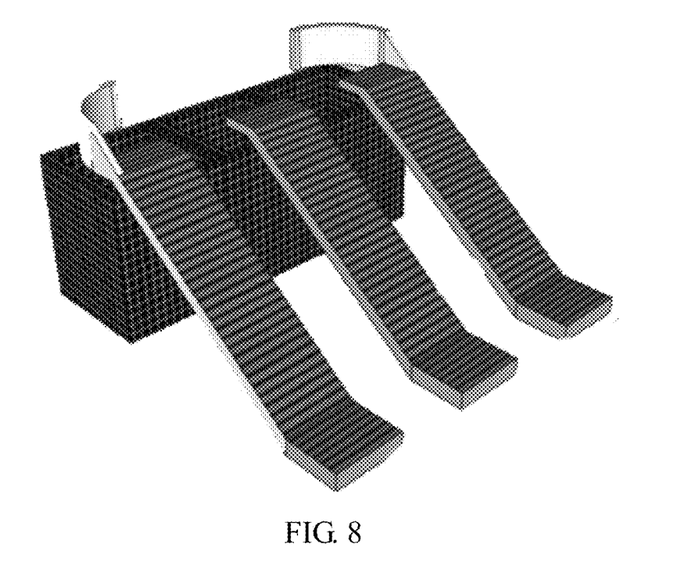
FIG. 8 is a schematic diagram of a transferring device according to an embodiment of the present application.

According to a specific implementation, the transferring device A2 has an ID, which matches the road direction information of the to-be-delivered item. Referring to FIG. 8, the transferring device is a device with multiple conveyor belts. Each conveyor belt transports an item to a certain height and then conveys the item to a receiving container of a different road direction. Of course, besides the lifting conveyor belt in FIG. 8, the conveyor belt may further be a flat conveyor belt or a conveyor belt for delivering goods to a low position. The bottom of each conveyor belt has one receiving end. The heights of the receiving ends may be the same, or may be different. The height values of the receiving ends of different numbered conveyor belts are stored in the server. Besides the configuration illustrated in FIG. 8, the transferring device may further be an item receiving device with a certain height (e.g., a cage trolley). In this case, the edge of the item receiving device is its receiving end.

Generally, the server may call the mobile transporting device A1 in a form of a task. According to a specific implementation, the mobile transporting device A1 may obtain the road direction information of an item delivered in the current task and determine the transferring device A2 matching the current task according to the road direction information of the item delivered in the current task.

In the embodiment described above, the server may be a scheduling server, or may be other types of servers. According to a specific implementation, a communication device A13 is further in a communication connection with the scheduling server. The communication device A13 obtains information of the transferring device through the scheduling server.

Figure 9:
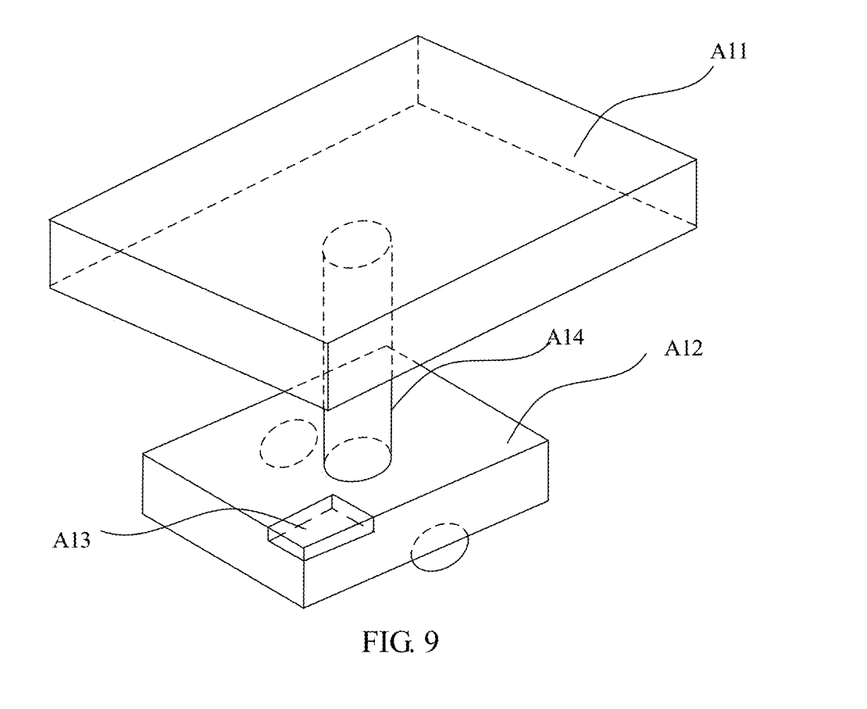
FIG. 9 is a structural diagram illustrating a mobile transporting device according to an embodiment of the present application.

FIG. 9 is a structural diagram of a mobile transporting device according to an embodiment of the present application. The transporting device may include a bearing device A11, a first height adjustment device A14, and a communication device A13. The bearing device A11 may carry one or more to-be-delivered items. The communication device A13 may be in a communication connection with the server or the transferring device A2. According to a specific implementation, the mobile transporting device A1 has the first height adjustment device A14 which may adjust a height of the bearing device.

According to a specific implementation, the mobile transporting device A1 obtains a height of the receiving end A21 of the transferring device A2 matching the current task and controls the first height adjustment device to lift the bearing device to a first preset height. The first preset height matches the height of the receiving end A21 of the transferring device A2 matching the current task.

According to a specific implementation, the transferring device A2 includes a second height adjustment device, which is operative to adjust the height of the receiving end A21. The mobile transporting device A1 and the transferring device A2 respectively adjust their own heights, thereby providing even wider range of height matching in the process of item transportation.

According to a specific implementation, the transferring device A2 obtains a height of the bearing device of the mobile transporting device A1 matching the current task and controls the second height adjustment device to adjust the receiving end A21 to a second preset height, which matches the height of the bearing device of the mobile transporting device A1 matching the current task.

According to a specific implementation, the system further includes:

a scheduling server, which is connected to at least one selected from the group consisting of the mobile transporting device A1 and the transferring device A2. The server illustrated in FIG. 7 may be one specific application of the scheduling server.

In order to facilitate the operation of the mobile transporting device A1, the mobile transporting device A1 is provided with a built-in battery, so that the mobile transporting device A1 may accomplish the transportation task by using its own energy. The mobile transporting device A1 may monitor the remaining state of charge of the battery in real time. When the remaining state of charge of the mobile transporting device A1 reaches a threshold, the mobile transporting device A1 may be controlled to get charged in a preset area. In addition, the mobile transporting device A1 may obtain state of charge information of the mobile transporting device A1. When the remaining state of charge of the mobile transporting device A1 meets the preset condition, the mobile transporting device A1 may report the remaining state of charge information to the scheduling server. The scheduling server then may determine whether to control the mobile transporting device A1 to move to the preset area to get charged taking into consideration multiple factors such as current state of charge, a scheduling task, etc.

When the remaining state of charge of the mobile transporting device A1 meets a preset condition, the scheduling server may control the mobile transporting device A1 to move to a preset area to get charged.

According to a specific implementation, the mobile transporting device A1 may be navigated by identifying a graphic combination. The graphic combination may be a 2D barcode, or may be any graphic combination combined by other graphics. The item delivery device determines current geographical location information by identifying the graphic combination.

According to a specific implementation, the bearing device A11 has an item delivery device, which is configured for delivering the item on the bearing device A11 to a designated destination. The item delivery device may be a conveyor belt, a drum, a cross belt, a flap or other devices operative to move the item.

Figure 10:
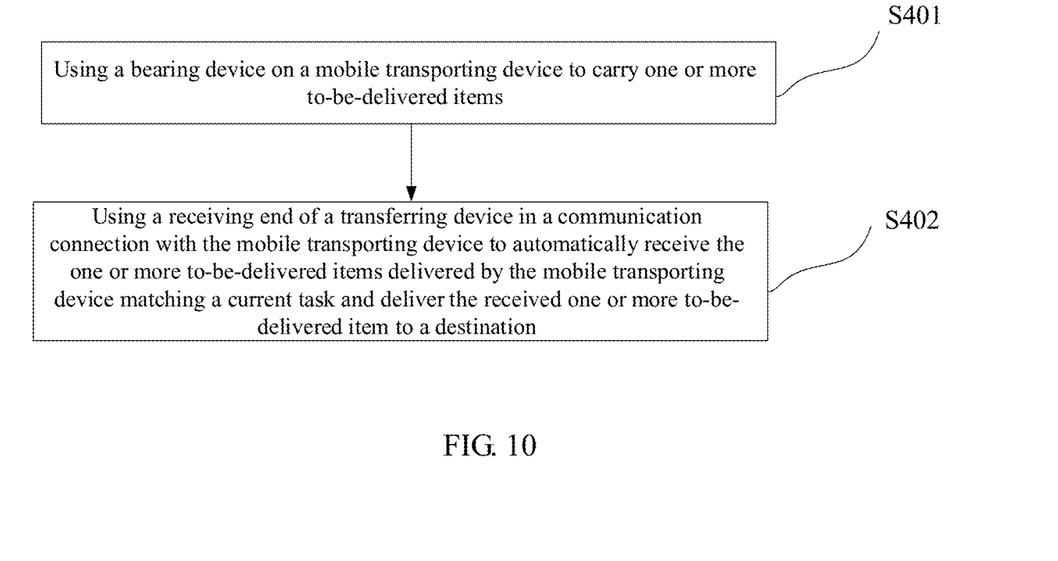
FIG. 10 is a flowchart illustrating an item delivery method according to an embodiment of the present application.

Corresponding to the device embodiment described above, embodiments of the present application further provide an item delivery method. Referring to FIG. 10, the method includes steps described below.

In step S401, a bearing device on a mobile transporting device is used to carry one or more to-be-delivered items.

The bearing device is operative to carry one or more to-be-delivered items. The one or more to-be-delivered items may be a package, or may be other to-be-transported items. The bearing device is a device having an accommodation structure. After a delivery device arrives at an item sending end (e.g., an item supplying end for sending items), the item may be manually placed on the bearing device, or the to-be-sorted item may be automatically placed through an automatic loading device (e.g., a robot arm) of the item supplying end.

According to delivery tasks, the bearing device may receive one or more to-be-delivered items. The destinations of the one or more to-be-delivered items may be the same, or may be different. When the delivery destinations are the same, the bearing device may transport the items to the item receiving end (e.g., an item conveyor belt or a cage trolley) at one time or in multiple times. When the delivery destinations are different, the bearing device may release corresponding items at item receiving ends representing different destinations. In this way, the space of the bearing device may be fully used, and the efficiency of the mobile transporting device A1 may be improved. Specifically, the mobile transporting device A1 with an adaptive height may be a package delivery robot, or may be other devices performing the same or similar functions.

Optionally, once the bearing device receives the item, the mobile transporting device A1 may obtain item information of the one or more to-be-delivered items. The item information includes a delivery destination of the to-be-delivered item (e.g., Haidian District, Beijing) and a type of the to-be-delivered item (e.g., books or fragile items). After obtaining the item information, the mobile transporting device A1 may obtain information of a transferring device (e.g., a conveyor belt, a conveyor elevator, or a cage trolley) corresponding to the delivered item by checking a server. The height of a receiving end A21 of the transferring device matching the mobile transporting device A1 is naturally queried by querying the information of the transferring device. On the one hand, the height of the receiving end A21 of the transferring device matching the mobile transporting device A1 may be issued through the server. On the other hand, there may be a height database inside the mobile transporting device A1, and the mobile transporting device A1 may obtain the height information by querying the height database.

When the mobile transporting device A1 approaches the transferring device, a height adjustment device on the mobile transporting device A1 adjusts a height of the bearing device to a height matching the receiving end A21. The height adjustment device may be a common hydraulic lifting device, a common stud lifting device, or other common lifting devices, where the structure of the height adjustment device will not be limited herein.

In step S402, a receiving end of a transferring device in a communication connection with the mobile transporting device is used to automatically receive the to-be-delivered item delivered by the mobile transporting device matching a current task and to deliver the received one or more to-be-delivered items to a destination.

The transferring device A2 has the receiving end A21. The receiving end A21 may receive the item A4 delivered by the mobile transporting device A1. The item A4 is delivered to a corresponding receiving container A5 (e.g., a cage trolley, a package bag, etc.) through a delivery device (e.g., a conveyor belt) on the transferring device. The transferring device A2 has the receiving end A21 for receiving the one or more to-be-delivered items. The transferring device A2 automatically receives to-be-delivered items delivered by the mobile transporting device A1 matching a current task through the receiving end A21 and transfers the received to-be-delivered items to the destination.

According to a specific implementation, the to-be-delivered item has road direction information, and the mobile transporting device A1 is capable of obtaining the road direction information of the to-be-delivered item.

According to a specific implementation, the transferring device A2 has an ID, which matches the road direction information of the one or more to-be-delivered items.

According to a specific implementation, the mobile transporting device A1 obtains road direction information of an item delivered in the current task and determines a transferring device A2 matching the current task according to the road direction information of the item delivered in the current task.

According to a specific implementation, a first height adjustment device is set on the mobile transporting device A1, and the first height adjustment device is operative to adjust a height of the bearing device.

According to a specific implementation, a height of the receiving end A21 of the transferring device A2 matching the current task is obtained and the first height adjustment device is controlled to lift the bearing device to a first preset height. The first preset height matches the height of the receiving end A21 of the transferring device A2 matching the current task.

According to a specific implementation, a second height adjustment device is set on the transferring device A2, and the second height adjustment device is operative to adjust the height of the receiving end A21.

According to a specific implementation, a height of the bearing device of the mobile transporting device A1 matching the current task is obtained and the second height adjustment device is controlled to adjust the receiving end A21 to a second preset height, which matches the height of the bearing device of the mobile transporting device A1 matching the current task.

According to a specific implementation, the method further includes:

configuring a scheduling server to connect to at least one selected from the group consisting of the mobile transporting device A1 and the transferring device A2.

According to a specific implementation, the scheduling server is operative to obtain state of charge information of the mobile transporting device A1.

When the remaining state of charge of the mobile transporting device A1 meets a preset condition, the scheduling server controls the mobile transporting device A1 to move to a preset area to get charged.

According to a specific implementation, the mobile transporting device A1 may be navigated by identifying a graphic combination.

According to a specific implementation, the server obtains the road direction information of the to-be-sorted items, and further determines the transferring device A2 matching the to-be-sorted items according to the road direction information of the to-be-sorted items. The server may then call the mobile transporting device A1 in the form of a task. The server may further plan a path for the mobile transporting device A1 to travel on based on the locations of the mobile transporting device A1 and the transferring device A2. The mobile transporting device A1 obtains the path on which it needs to travel and then travels to the transferring device A2 according to the path to be travelled.

According to a specific implementation, the server may call the mobile transporting device A1 in the form of a task. The mobile transporting device A1 may obtain the road direction information of the to-be-sorted items and determine the transferring device A2 matching the to-be-sorted items according to the road direction information of the to-be-sorted items, further plan a path for the mobile transporting device A1 to travel on based on the locations of the mobile transporting device A1 and the transferring device A2, and then travel to the transferring device A2 according to the path to be traveled.

It should be noted here that in the present application, the executor that obtains the road direction information of the to-be-sorted items, determines the transferring device A2 matching the to-be-sorted items, and plans the path to be traveled is determined depending on the computation capabilities of the actual server and mobile transporting device, the communication efficiency between the server and the mobile transporting device, and the ease of operation.

It is further noted that the reference signs A1, A2, A3, A4, and A5 as used in FIG. 7 are meant to be distinguished from those same reference signs used in other drawings, especially FIGS. 2 to 4, and FIG. 6. That is, the reader is reminded, when reading the description in connection with FIG. 7, the above reference signs denote the items shown in FIG. 7 only, where in particular, A1 refers to the mobile transporting device, A2 refers to the transferring device, A3 refers to the server, A4 refers to the item, and A5 refers to the corresponding receiving container; they are not to be confused otherwise.

The content of the method embodiments described above corresponds to the content of the system embodiments and so is not to be repeated herein.

The foregoing describes some illustrative embodiments of the present application. It is noted that the above description is merely illustrative and not exhaustive, and will not be limited to the various embodiments disclosed herein. For those having ordinary skill in the art, various modifications and variations are apparent without departing from the scope and spirit of the described various embodiments. Therefore, the scope of protection the present application is defined in and by the appended claims.

What is claimed is:

1. A sorting area layout, comprising an item collecting area located in a center of the sorting area and logical partitions around the item collecting area;
    wherein the item collecting area comprises a first item collecting area and a second item collecting area, and the logical partitions comprise a first logical partition adjacent to the first item collecting area and a second logical partition adjacent to the second item collecting area; and
    wherein the first logical partition comprises a first item dropping area configured for receiving items from the first item collecting area which are intended for a plurality of road directions, and the second logical partition comprises a second item dropping area configured for receiving items from the second item collecting area which are intended for a plurality of road directions.

2. The sorting area layout of claim 1, wherein the first item dropping area and the second item dropping area are each configured for receiving items intended for all road directions.

3. The sorting area layout of claim 1, wherein the sorting area further comprises a common area located outside the first logical partition and the second logical partition, and the common area comprises a third item dropping area;
    wherein the first item dropping area and the second item dropping area are each configured for receiving items intended for only a part of all road directions, and the third item dropping area is configured for receiving items from the remaining road directions.

4. The sorting area layout of claim 1, wherein an edge of the first item dropping area and an edge of the second item dropping area each comprise a structure recessed toward the center of the sorting area.

5. The sorting area layout of claim 4, wherein the edge of the first item dropping area and the edge of the second item dropping each are a sawtooth structure.

6. An item sorting system, configured for sorting items in a sorting area, wherein the item sorting system comprises a plurality of mobile transporting devices, and the sorting area comprises an item collecting area and an item dropping area around the item collecting area, wherein the item collecting area comprises at least a first item collecting area and a second item collecting area, and the sorting area comprises a first logical partition adjacent to the first item collecting area and a second logical partition adjacent to the second item collecting area;
    the item dropping area comprises a first item dropping area and a second item dropping area, the first item dropping area is located in the first logical partition, and the second item dropping area is located in the second logical partition;
    wherein a first mobile transporting device located in the first logical partition is configured to obtain an item from the first item collecting area and move to the first item dropping area along the first logical partition to deliver the item to the first item dropping area; and
    a second mobile transporting device located in the second logical partition is configured to obtain an item from the second item collecting area and move to the second item dropping area along the second logical partition to deliver the item to the second item dropping area.

7. The item sorting system of claim 6, wherein at least one of the first item dropping area or the second item dropping area comprises a plurality of temporary item storage containers intended for all road directions.

8. The item sorting system of claim 6, wherein at least one of the first item dropping area or the second item dropping area comprises a plurality of temporary item storage containers intended for a part of all road directions, wherein the sorting area further comprises a common area located outside the first logical partition and the second logical partition, wherein the common area comprises a plurality of temporary item storage containers intended for the remaining road directions.

9. The item sorting system of claim 6, wherein an edge of the item dropping area comprises a structure recessed toward a center of the sorting area.

10. The item sorting system of claim 9, wherein the edge of the item dropping area is a sawtooth structure.

11. The item sorting system of claim 6, further comprising a server that runs a path optimization method for the item sorting system, the path optimization method comprising:
mapping a container with a short delivery distance to a road direction with a high delivery probability, so as to minimize a total delivery distance of a mobile transporting device.

12. The item sorting system of claim 11, wherein the "mapping a container with a short delivery distance to a road direction with a high delivery probability, so as to minimize a total delivery distance of a mobile transporting device" comprises:
assuming there are N road directions and N temporary item storage containers in the sorting area, a path distance of one round-trip delivery corresponding to an ith temporary item storage container is $S_i$, a probability of a jth road direction being selected in each delivery is $P_j$, and i, j $\in$ E $\{1, 2, \ldots, N\}$, so that each probability meets the following relationship:

$$\sum_{j=1}^{N} P_j = 1$$

then a mapping of the container i to the road direction j, is optimized by the following formula:

$$f_{opt}: i \to j = \underset{f: i \to j}{\operatorname{argmin}} \sum_{i=1}^{N} E(S_i P_i).$$

* * * * *